(12) United States Patent
Lee et al.

(10) Patent No.: US 9,910,443 B1
(45) Date of Patent: Mar. 6, 2018

(54) DRIVE CONTROL APPARATUS AND METHOD FOR AUTONOMOUS VEHICLE

(71) Applicant: HYUNDAI MOTOR COMPANY, Seoul (KR)

(72) Inventors: Dong Hwi Lee, Suwon-si (KR); Keon Yup Chu, Suwon-si (KR); Su Jung Yoo, Incheon (KR); Tae Sung Choi, Sacheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/364,708

(22) Filed: Nov. 30, 2016

(30) Foreign Application Priority Data

Oct. 14, 2016 (KR) .................. 10-2016-0133644

(51) Int. Cl.
| | | |
|---|---|---|
| *G05D 1/02* | (2006.01) | |
| *G05D 1/00* | (2006.01) | |
| *B60W 10/20* | (2006.01) | |
| *B60W 10/06* | (2006.01) | |
| *B60W 10/184* | (2012.01) | |

(Continued)

(52) U.S. Cl.
CPC .......... *G05D 1/0223* (2013.01); *B60Q 1/346* (2013.01); *B60W 10/06* (2013.01); *B60W 10/184* (2013.01); *B60W 10/20* (2013.01); *B60W 30/10* (2013.01); *B60W 30/162* (2013.01); *G05D 1/0088* (2013.01); *G05D 1/0231* (2013.01); *G08G 1/166* (2013.01); *B60W 2420/42* (2013.01); *B60W 2420/52* (2013.01); *B60W 2550/30* (2013.01); *B60W 2750/30* (2013.01)

(58) Field of Classification Search
CPC ...... G05D 1/0223; B60Q 1/346; B60W 10/20
See application file for complete search history.

(56) References Cited

U.S. PATENT DOCUMENTS 9,714,036 B2 * 7/2017 Yamaoka ............ B60W 30/182
2008/0243378 A1 10/2008 Zavoli (Continued)

FOREIGN PATENT DOCUMENTS

| JP | 2000-293799 A | 10/2000 |
| JP | 2002-243476 A | 8/2002 |

(Continued)

OTHER PUBLICATIONS

Office Action dated Aug. 17, 2017 of corresponding Korean Patent Application No. 10-2016-0133644—9 pages.

*Primary Examiner* — Alex C Dunn
(74) *Attorney, Agent, or Firm* — Knobbe Martens Olson & Bear LLP (57) ABSTRACT

A drive control apparatus and method for an autonomous vehicle is provided. The drive control method includes: determining whether a subject vehicle has entered a pocket lane area during autonomous driving; determining whether the subject vehicle enters a pocket lane according to pocket lane conditions that are determined on the basis of surrounding environment information of the subject vehicle when the subject vehicle enters the pocket lane area; generating a tracking path with respect to a front vehicle when it is determined to enter the pocket lane; and performing the autonomous driving by controlling the subject vehicle to follow the front vehicle according to the tracking path with respect to the front vehicle.

15 Claims, 9 Drawing Sheets

(51) Int. Cl.
*B60W 30/10* (2006.01)
*B60W 30/16* (2012.01)
*G08G 1/16* (2006.01)
*B60Q 1/34* (2006.01)

(56) References Cited

U.S. PATENT DOCUMENTS

| | | | |
|---|---|---|---|
| 2011/0190972 A1* | 8/2011 | Timmons | G01C 21/34 |
| | | | 701/31.4 |
| 2016/0187881 A1* | 6/2016 | Lee | G05D 1/0088 |
| | | | 701/23 |
| 2016/0318511 A1* | 11/2016 | Rangwala | B60W 50/14 |
| 2017/0057496 A1* | 3/2017 | Toyoda | B60W 30/09 |
| 2017/0203770 A1* | 7/2017 | Kondo | B60W 50/14 |
| 2017/0221366 A1* | 8/2017 | An | G08G 1/0965 |
| 2017/0259820 A1* | 9/2017 | Takahashi | B60W 30/165 |
| 2017/0301239 A1* | 10/2017 | Lee | G08G 1/166 |

FOREIGN PATENT DOCUMENTS

| | | |
|---|---|---|
| JP | 2007-153091 A | 6/2007 |
| JP | 2009-31029 A | 2/2009 |
| JP | 2009-31142 A | 2/2009 |
| JP | 5857364 B2 | 2/2016 |
| KR | 10-0946525 B1 | 3/2010 |
| KR | 10-2016-0057756 A | 5/2016 |

\* cited by examiner

FIG.9

DRIVE CONTROL APPARATUS AND METHOD FOR AUTONOMOUS VEHICLE

CROSS-REFERENCE TO RELATED APPLICATION

This application is based on and claims the benefit of priority to Korean Patent Application No. 10-2016-0133644, filed on Oct. 14, 2016, in the Korean Intellectual Property Office, the disclosure of which is incorporated herein in its entirety by reference.

TECHNICAL FIELD

The present disclosure relates to a drive control apparatus and method for an autonomous vehicle, assisting the autonomous vehicle to safely drive on a pocket lane that is present on a forward path of the autonomous vehicle, according to pocket lane conditions.

BACKGROUND

There are many variables in various situations on the road, and one of them is intersection conditions. Unlike a general road, a pocket lane (turn pocket) may be present at the intersection, and vehicles are waiting to make a left turn in the pocket lane. When there are many vehicles waiting for the left turn, the vehicles may form a queue on a driving lane as well as the pocket lane. In this situation, if an autonomous vehicle is only trying to drive along a path (global path) originally generated, it may cause an accident.

SUMMARY

An aspect of the present disclosure provides a drive control apparatus and method for an autonomous vehicle, controlling autonomous driving to allow the autonomous vehicle to enter a pocket lane safely by analyzing pocket lane conditions when the autonomous vehicle enters the pocket lane to make a left turn or a U-turn.

According to an aspect of the present disclosure, a drive control method for an autonomous vehicle includes the steps of: determining whether or not the subject vehicle has entered a pocket lane area during autonomous driving; determining whether or not the subject vehicle enters a pocket lane according to pocket lane conditions that are determined on the basis of surrounding environment information of the subject vehicle when the subject vehicle enters the pocket lane area; generating a tracking path with respect to a front vehicle when it is determined to enter the pocket lane; and performing the autonomous driving by controlling the subject vehicle to follow the front vehicle according to the tracking path with respect to the front vehicle.

The pocket lane area may be defined as an area within a predetermined distance from a pocket lane entry point in a straight driving lane that is positioned on the right of the pocket lane.

A length of the pocket lane area may be calculated using a road speed limit and a time taken for the vehicle to reach the pocket lane when the vehicle is driving at the road speed limit.

The step of determining whether or not the subject vehicle enters a pocket lane may include: determining the pocket lane conditions by detecting a degree of traffic congestion in the pocket lane, a distance between a rear vehicle and the subject vehicle, a relative speed of the rear vehicle, and a color of a traffic light that is turned on, on the basis of data measured by sensors; determining whether or not the subject vehicle is allowed to stop according to the pocket lane conditions; turning on a turn signal and reducing a vehicle speed when the subject vehicle is allowed to stop; checking whether or not the front vehicle is present in the pocket lane while the subject vehicle is reducing the vehicle speed; detecting a position of the front vehicle when the front vehicle is present in the pocket lane; determining whether or not the subject vehicle is allowed to enter the pocket lane along a driving path based on the position of the front vehicle; and performing the autonomous driving along the driving path when the subject vehicle is allowed to enter the pocket lane.

The drive control method may further include generating a new driving path to reach a predetermined destination by driving on a straight driving lane unless the subject vehicle is allowed to stop in the step of determining whether or not the subject vehicle is allowed to stop.

The drive control method may further include performing the autonomous driving along the driving path unless the front vehicle is present in the pocket lane in the step of checking whether or not the front vehicle is present in the pocket lane.

The drive control method may further include determining whether or not the subject vehicle enters the pocket lane unless the subject vehicle is allowed to enter the pocket lane in the step of determining whether or not the subject vehicle is allowed to enter the pocket lane along the driving path.

According to another aspect of the present disclosure, a drive control apparatus for an autonomous vehicle includes: a sensor unit sensing surrounding environment information of the subject vehicle; a driving path generator detecting pocket lane conditions on the basis of the surrounding environment information when the subject vehicle enters a pocket lane area during autonomous driving, determining whether or not the subject vehicle enters a pocket lane according to the detected pocket lane conditions, and generating a driving path; and a vehicle controller controlling the autonomous driving of the subject vehicle according to the driving path.

The driving path generator may analyze the pocket lane conditions by detecting a degree of traffic congestion in the pocket lane, a distance between a rear vehicle and the subject vehicle, a relative speed of the rear vehicle, and a color of a traffic light that is turned on through the sensor unit.

The driving path generator may determine whether or not the subject vehicle is allowed to stop according to results of analyzing the pocket lane conditions.

The driving path generator may control the vehicle controller to turn on a turn signal and reduce a vehicle speed when the subject vehicle is allowed to stop, and check whether or not a front vehicle is present in the pocket lane.

The driving path generator may detect a position of the front vehicle in the pocket lane when the front vehicle is present in the pocket lane, and determine whether or not the subject vehicle is allowed to enter the pocket lane along the driving path.

The driving path generator may provide the driving path to the vehicle controller when the subject vehicle is allowed to enter the pocket lane along the driving path.

The driving path generator may generate a tracking path with respect to the front vehicle unless the subject vehicle is allowed to enter the pocket lane along the driving path.

The driving path generator may search and generate a new driving path to reach a predetermined destination by driving on a straight driving path unless the subject vehicle is allowed to stop.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Terms used in the present specification are merely used to describe particular embodiments, and are not intended to limit the present inventive concept. Unless explicitly described to the contrary, the terms "include (including)", "have (having)", and the like used herein will be understood to imply the inclusion of corresponding elements but not the exclusion of any other elements.

In addition, the terms "unit", "-er (-or)", "module", and the like used herein may indicate a unit for processing at least one function or operation, which may be provided as hardware, software, or a combination of hardware and software. Furthermore, the determiners, "a (an)", "the", and the like, may be used to include both a singular expression and a plural expression, unless they have clearly different meanings in the context.

Hereinafter, embodiments of the present disclosure will be described in detail with reference to the accompanying drawings.

There are many variables in various situations on the road, and one of them is intersection conditions. Unlike a general road, a pocket lane (turn pocket) may be present at an intersection, and vehicles are waiting to make a left or right turn at the pocket lane. When there are many vehicles waiting for the left turn, the vehicles may form a queue on a driving lane as well as the pocket lane. In this situation, if an autonomous vehicle is only trying to drive along a path (global path) originally generated without considering waiting cars in the pocket, following traffics, or without considering an alternative path, an accident may be caused.

When making a left (or right) turn at the intersection, an autonomous vehicle may take the following two steps: first, following a left-turn path at the intersection set by a (originally generated) global path; and second, generating a local path considering conditions identified while approaching to the intersection. If the autonomous vehicle cannot generate a new or updated path once an original global path has been generated, the vehicle can drive only along the originally global path regardless of traffic situation near the pocket, which may result in undesirable delay or an accident.

The illustrated embodiments of FIGS. 1-9 relate to driving of an autonomous vehicle using a predetermined driving route (original global path) which includes a (turn) pocket at an intersection. When the vehicle is approaching the pocket along the original global path, the vehicle collects information from its sensors and determines a traffic situation neat the pocket. Based on the determined traffic situation, the vehicle determines whether to enter the pocket according to the original global path or to pass the pocket using a new or updated driving path.

When the vehicle is approaching the pocket, a controller of the vehicle repeatedly determines whether the pocket has enough space for the vehicle to enter. Here the controller refers to one or more computing devices installed in the vehicle including path generator 150 and vehicle controller 170. In embodiments, the controller determines whether there is enough space at the pocket for the vehicle to move in when the vehicle arrives at the pocket or in some embodiment a pocket entrance. In embodiments, the pocket entrance refers to an interface between the pocket (lane) and an immediately neighboring lane where broken lane lines separate the pocket (lane) and the immediately neighboring lane. In some embodiments, the pocket entrance refers to the pocket entry point illustrated in FIG. 4.

In some embodiments, in determining whether the pocket has enough space, the controller assesses whether there is another vehicle in the pocket as the vehicle is approaching the pocket. In determining whether the pocket has enough space, the controller utilizes information collected from one or more sensors 110, 140 of the vehicle.

In determining whether there is enough space to move in, the controller considers the current position of one or more other vehicles in the pocket, (current or expected) speed of the other vehicle(s), the vehicle's expected time of travel to the pocket (pocket entrance) computed based on information from the sensors of the vehicle.

In embodiments, the vehicle's controller begins the determination of enough space when it reaches at a predetermined distance from the pocket. In embodiments, the vehicle's controller computes the estimated time of travel to the pocket is shorter than a predetermined reference.

In embodiments, when there is enough space within the pocket for the vehicle to enter, and also it is determined that there is no other car in the pocket the controller controls the vehicle to drive according to the originally determined global path (without re-generating a global path).

In embodiments, when it is determined that there is enough space within the pocket for the vehicle to enter and also it is determined that there is another vehicle in the pocket ahead of the vehicle, the controller causes the vehicle to generate a local driving path which allows the vehicle temporality off from the original global path at the pocket. The controller utilize information from the sensors of the vehicle to consider location, speed of the other vehicle for generating the local path.

In embodiments, the vehicle does not generate a new global path (from the original departure to the original destination) when the vehicle generates and drive according to the newly generated local driving path, such that the vehicle can follow the original global path after making a turn at the pocket.

In embodiments, when it is determined that there is no enough space, the controller further determines whether (1) to slow down such that the vehicle can stop before the pocket (at a pocket entrance) on the current lane, or (2) to pass the pocket entrance and to cross the intersection on the current lane.

In embodiments, the vehicle at the pocket entrance on the current lane, the vehicle monitors movement of another vehicle in the pocket. In embodiments, the vehicle monitors another vehicle in the pocket that is blocking the pocket entrance and immediately ahead of the vehicle. Subsequently, when the vehicle detects the other vehicle moving forward inside the pocket, the vehicle determines whether to follow the other vehicle for entering the pocket. When the vehicle determines to follow that vehicle, the controller generates a local path that is different from the original global path. The newly generated local path is off from the original global path at the pocket. The controller utilizes information from the sensors of the vehicle and considers at least one of the location of the other vehicle and the speed of the other vehicle when generating the local path.

In embodiments, in case the vehicle determines to pass the pocket and to cross the intersection on the current lane (to keep moving forward on the current lane for crossing the intersection), the controller initiates a process for generating a new global path (an updated path to the destination of the original route) in which the vehicle drives straight crossing the intersection rather than turning at the intersection. The controller initiates the process without a delay after determining to pass the pocket such that the new global path can be available promptly prior to pass the pocket.

Figure 1:
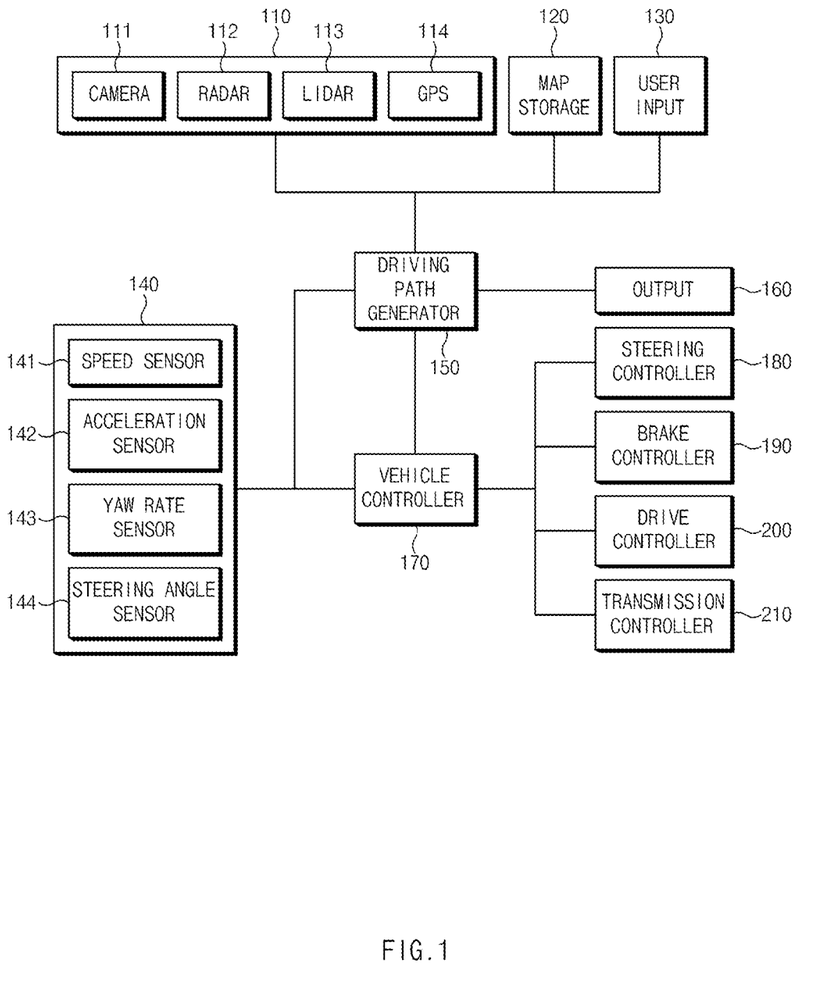
FIG. 1 is a block diagram illustrating a drive control apparatus for an autonomous vehicle, according to an embodiment of the present disclosure.

FIG. 1 is a block diagram illustrating a drive control apparatus for an autonomous vehicle, according to an embodiment of the present disclosure.

As illustrated in FIG. 1, the drive control apparatus for an autonomous vehicle, according to the embodiment of the present disclosure, includes a sensor unit 110, a map storage 120, a user input 130, a vehicle sensor unit 140, a driving path generator 150, an output 160, a vehicle controller 170, a steering controller 180, a brake controller 190, a drive controller 200, and a transmission controller 210. Here, the driving path generator 150, the vehicle controller 170, the steering controller 180, the brake controller 190, the drive controller 200, and the transmission controller 210 include a processor and a memory. The driving path generator 150, the vehicle controller 170, the steering controller 180, the brake controller 190, the drive controller 200, and the transmission controller 210 may mutually exchange data (information) through an in-vehicle network system such as Controller Area Network (CAN), Media Oriented Systems Transport (MOST), Local Interconnect Network (LIN), or X-by-Wire (Flexray).

The sensor unit 110 may obtain information about the surrounding environment of a vehicle. Here, the surrounding environment information includes a distance between the subject vehicle and a rear vehicle, a relative speed of the rear vehicle, a position of a front vehicle (a preceding vehicle), and obstacle and traffic light information.

The sensor unit 110 includes a camera 111, a radar 112, a LiDAR (Light Detection and Ranging) 113, and a global positioning system (GPS) 114. The sensor unit 110 may detect images of the surroundings of the vehicle, and the information about the distance between the subject vehicle and the rear vehicle, the relative speed of the rear vehicle, the position of the front vehicle, the obstacles and/or the traffic lights through the camera 111, the radar 112, and the LiDAR 113, and detect a current position of the subject vehicle through the GPS 114.

The map storage 120 may store a detailed map with discernible lanes in the form of database (DB). The detailed map may be automatically updated using wireless communications on a regular basis or may be manually updated by a user.

The map storage 120 may be provided as at least one of storage media such as a flash memory, a hard disk, a secure digital (SD) card, a random access memory (RAM), a read only memory (ROM), and a web storage.

The user input 130 may generate data that is input by the user. For example, the user input 130 may generate destination information (for example, a place name and/or coordinates) according to the user input. The user input 130 may be a keypad, a dome switch, a touch pad, a jog wheel, and/or a jog switch.

The vehicle sensor unit 140 may measure vehicle information about the subject vehicle. The vehicle information includes the speed, acceleration, yaw rate, steering angle, and the like of the subject vehicle. The vehicle sensor unit 140 includes a speed sensor 141, an acceleration sensor 142, a yaw rate sensor 143, and a steering angle sensor 144.

The driving path generator 150 may generate a driving path (a global path) for autonomous driving of a vehicle. When a destination is input through the user input 130, the driving path generator 150 may generate the driving path from the current position of the subject vehicle to the destination. Here, the driving path generator 150 may generate the driving path on the basis of the detailed map and/or real-time traffic information obtained through wireless communications. Wireless internet, mobile communication, or broadcasting communication may be used as a wireless communication technology.

When the vehicle enters a pocket lane area (an area used for entering a pocket lane) on a forward path during autonomous driving, the driving path generator 150 may recognize and determine pocket lane conditions on the basis of the surrounding environment information. In other words, the driving path generator 150 may detect the degree of traffic congestion in the pocket lane, the distance between the rear vehicle and the subject vehicle, the relative speed of the rear vehicle, the color of a traffic light that is turned on, and the like, on the basis of the data measured by the sensor unit 110. The driving path generator 150 may analyze the detected pocket lane conditions to determine whether or not the subject vehicle is allowed to stop in a straight driving lane (a straight lane) in order to enter the pocket lane. The driving path generator 150 may plan a driving path within the pocket lane area according to the detected pocket lane conditions.

When the subject vehicle is allowed to stop in the straight driving lane in order to enter the pocket lane, the driving path generator 150 may control the vehicle controller 170 to turn on a turn signal and reduce a vehicle speed, and may check whether or not a front vehicle is present in the pocket lane.

When the front vehicle is present in the pocket lane, the driving path generator 150 may detect the position of the front vehicle in the pocket lane to determine whether or not the subject vehicle is allowed to enter the pocket lane along the driving path. When the subject vehicle is allowed to enter the pocket lane along the driving path, the driving path generator 150 may provide the existing predetermined driving path to the vehicle controller 170.

When the subject vehicle is not allowed to enter the pocket lane along the driving path, the driving path generator 150 may generate a path for tracking the front vehicle (a front vehicle tracking path) and provide it to the vehicle controller 170. Therefore, the vehicle controller 170 may control the subject vehicle to follow the front vehicle on the basis of the front vehicle tracking path.

When the subject vehicle is not allowed to stop in the straight driving lane in order to enter the pocket lane, the driving path generator 150 may search and generate a new driving path in order to reach the predetermined destination while allowing the vehicle to drive on the straight driving lane. The driving path generator 150 may transmit the generated new driving path to the vehicle controller 170.

The output 160 may output visual information, auditory information and/or haptic information, and includes a display, an audio output module, and/or a haptic module.

For example, the output 160 may display the driving path output from the driving path generator 150 on the detailed map in an overlapping manner. Alternatively, the output 160 may output a warning message or a notification message as an audio signal according to the control of the driving path generator 150.

The vehicle controller 170 may control the autonomous driving of the vehicle according to the driving path generated by the driving path generator 150. The vehicle controller 170 may acquire the vehicle information from the vehicle sensor unit 140, and control the vehicle on the basis of the acquired vehicle information.

The steering controller 180 may control the steering of the vehicle, and may be provided as a motor drive power steering (MDPS). The steering controller 180 may control a steering angle of the vehicle according to the control of the vehicle controller 170.

The brake controller 190 may control the speed of the vehicle, and may be provided as an electronic stability control (ESC). The brake controller 190 may control a brake pressure according to a position of a brake pedal, or control a brake pressure according to the control of the vehicle controller 170.

The drive controller 200 that is a device for controlling an engine of the vehicle may control acceleration and deceleration of the vehicle. The drive controller 200 may be provided as an engine management system (EMS). The drive controller 200 may control a drive torque of the engine according to accelerator pedal position information. In addition, the drive controller 200 may control the engine output in order to follow a target drive torque required by the vehicle controller 170.

The transmission controller 210 may change gears of the vehicle. The transmission controller 210 may be provided as an electronic shifter or an electric shifter (a shift-by-wire (SBW) transmission).

Figure 2:
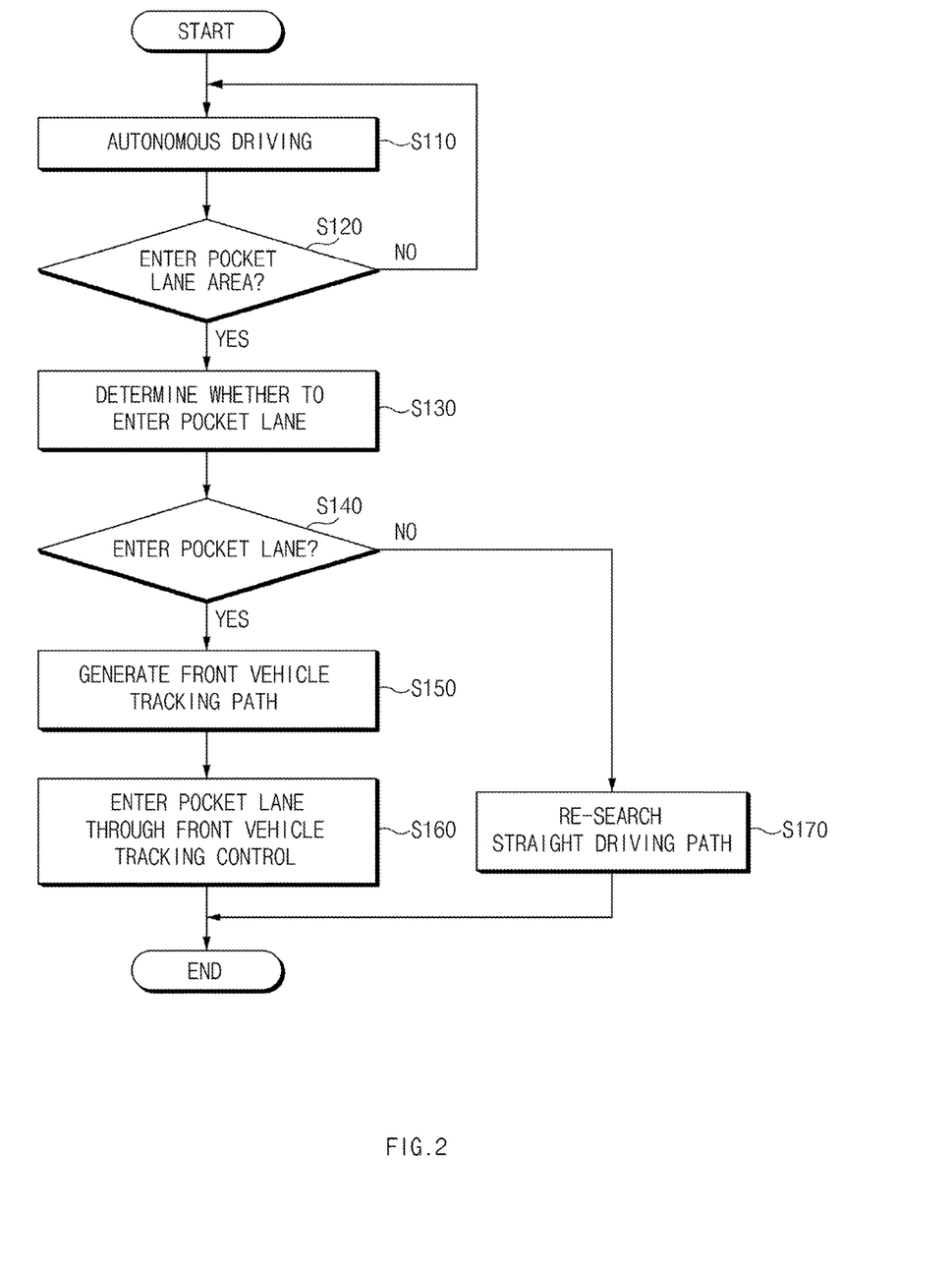
FIG. 2 is a flowchart illustrating a drive control method for an autonomous vehicle, according to an embodiment of the present disclosure.
Figure 3:
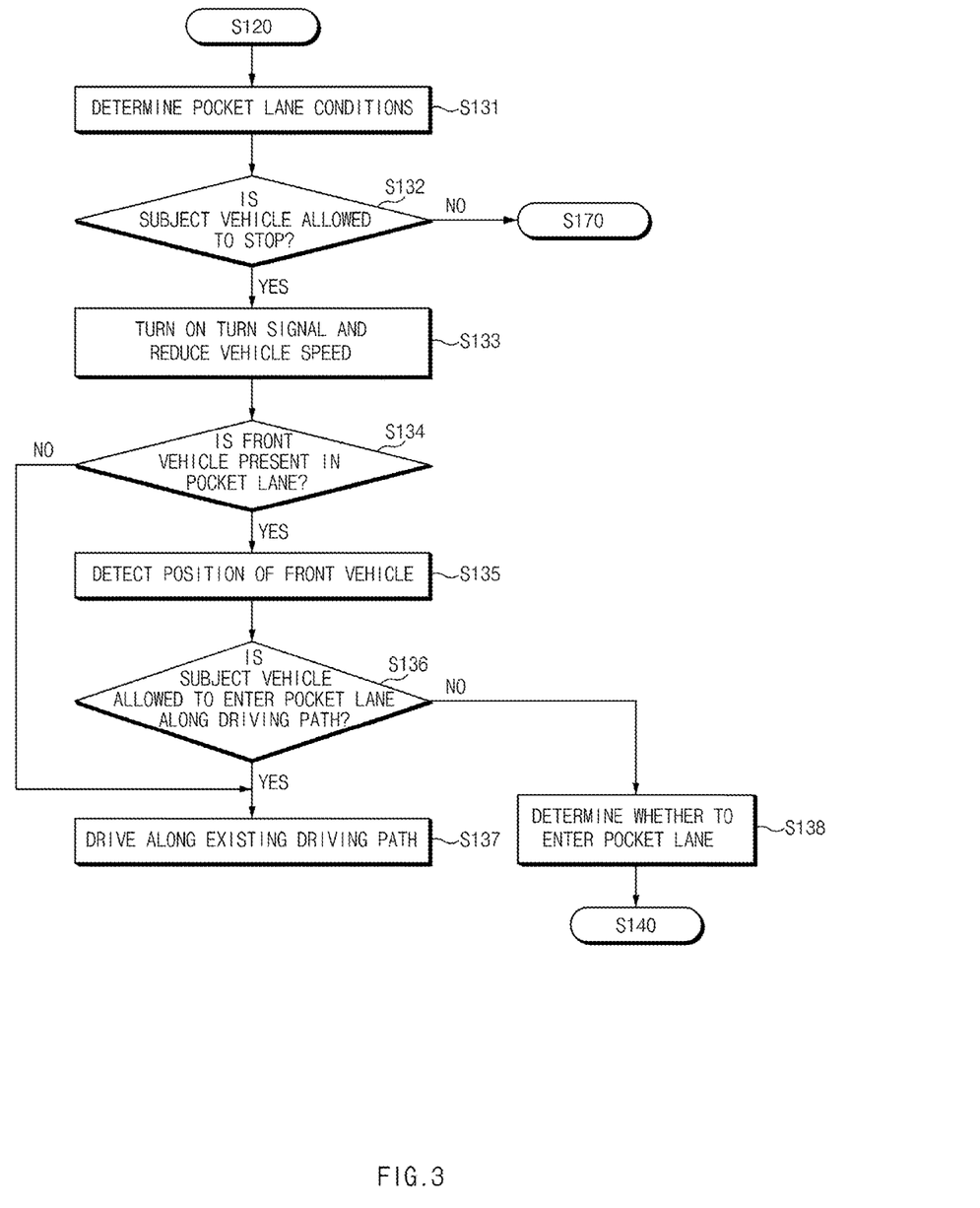
FIG. 3 is a flowchart illustrating a process of determining whether to enter a pocket lane illustrated in FIG. 2.
Figure 4:
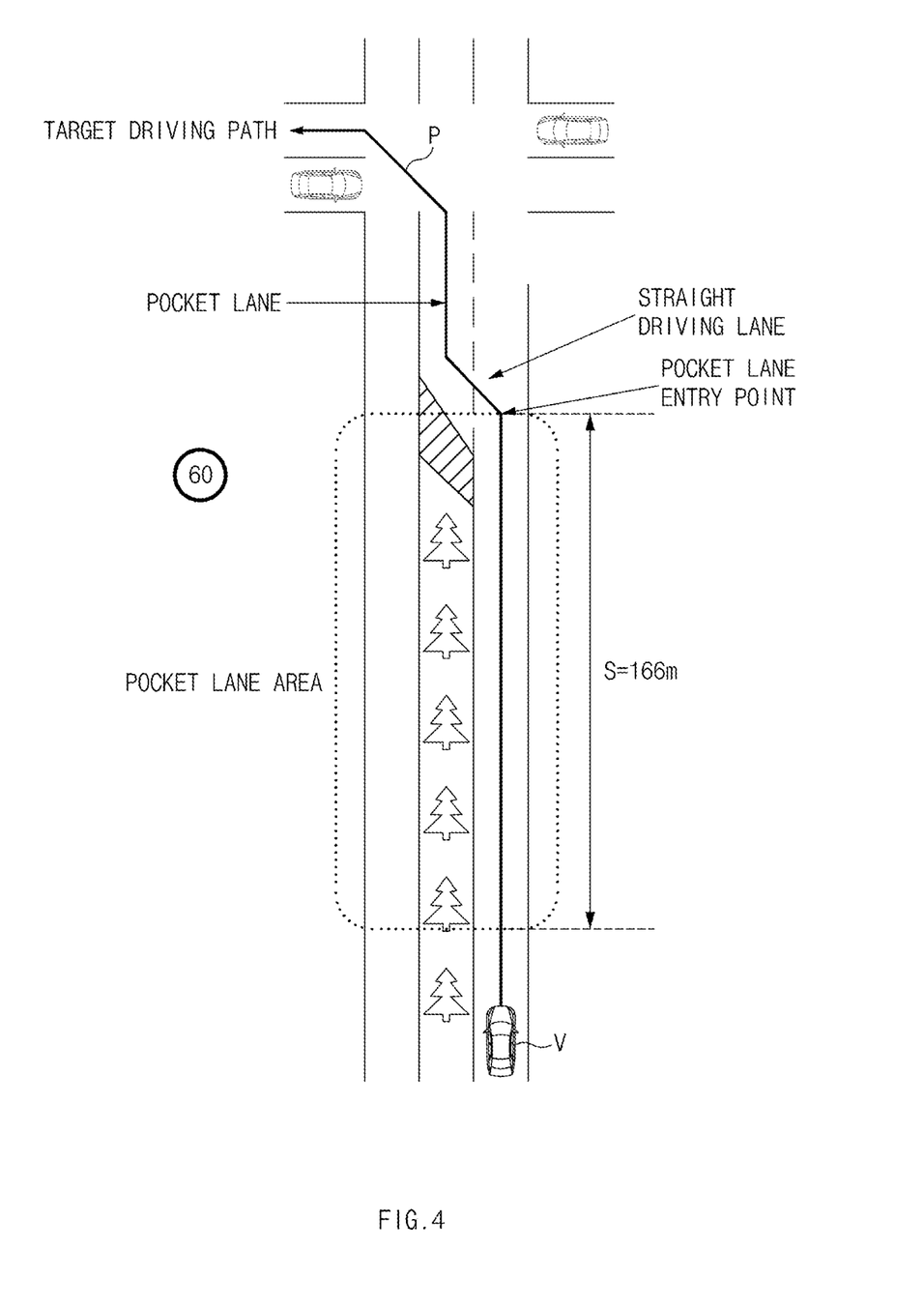
FIG. 4 illustrates a situation in which an autonomous vehicle enters a pocket lane area.

FIG. 2 is a flowchart illustrating a drive control method for an autonomous vehicle, according to an embodiment of the present disclosure. FIG. 3 is a flowchart illustrating a process of determining whether to enter a pocket lane illustrated in FIG. 2. FIG. 4 illustrates a situation in which an autonomous vehicle enters a pocket lane area. FIGS. 5 to 9 illustrate drive control according to pocket lane conditions.

When an autonomous driving start command is input by a user, the vehicle controller 170 may control the subject vehicle to perform autonomous driving on the basis of a driving path (a global path or a target driving path) provided by the driving path generator 150 in S110. In other words, the driving path generator 150 may set a destination according to the user's input, and generate the driving path from a current position of the subject vehicle to the destination. Thereafter, the driving path generator 150 may provide the driving path that is generated when the autonomous driving start command is input by the user to the vehicle controller 170. The vehicle controller 170 may control the steering controller 180, the brake controller 190, the drive controller 200, and the transmission controller 210 according to the vehicle information and the driving path to perform autonomous driving.

When the subject vehicle is expected to enter a pocket lane in a forward path during autonomous driving, the driving path generator 150 may determine whether or not the subject vehicle has entered a pocket lane area in S120. In other words, when the driving path for entering the pocket lane and turning left is generated, the driving path generator 150 may determine whether or not the subject vehicle has entered the pocket lane area before entering the pocket lane on the basis of a detailed map. Here, as illustrated in FIG. 4, the pocket lane may be a lane in which the vehicle is waiting to make a left-turn or U-turn, and the pocket lane area may be an area within a predetermined distance (a length of the pocket lane area) S from a pocket lane entry point in a straight driving lane that is positioned on the right of the pocket lane. The predetermined distance S, i.e., the length S of the pocket lane area may be represented by the following equation 1:

$$S = V \times t \qquad \text{Equation 1}$$

Here, V is a road speed limit, and t is a time taken for the vehicle to reach the pocket lane when driving at the speed limit, which is a tuning value. For example, when the tuning value is set to seconds in a section in which the road speed limit is 60 kph (16.67 mps), S is 166 m.

When the subject vehicle enters the pocket lane area, the driving path generator 150 may determine whether to enter the pocket lane according to pocket lane conditions in S130. The driving path generator 150 may analyze the pocket lane conditions and determine whether to enter the pocket lane according to the analysis results repeatedly until the vehicle passes through the pocket lane.

Hereinafter, referring to FIG. 3, a process of determining whether to enter the pocket lane in S130 will be described in more detail.

When the subject vehicle enters the pocket lane area, the driving path generator 150 may recognize the pocket lane conditions in S131. The driving path generator 150 may detect rear vehicle information and traffic light information through the sensor unit 110. Here, the rear vehicle information includes a distance between the rear vehicle and the subject vehicle and the relative speed of the rear vehicle, and the traffic light information includes the color of a traffic light that is turned on.

Figure 5:
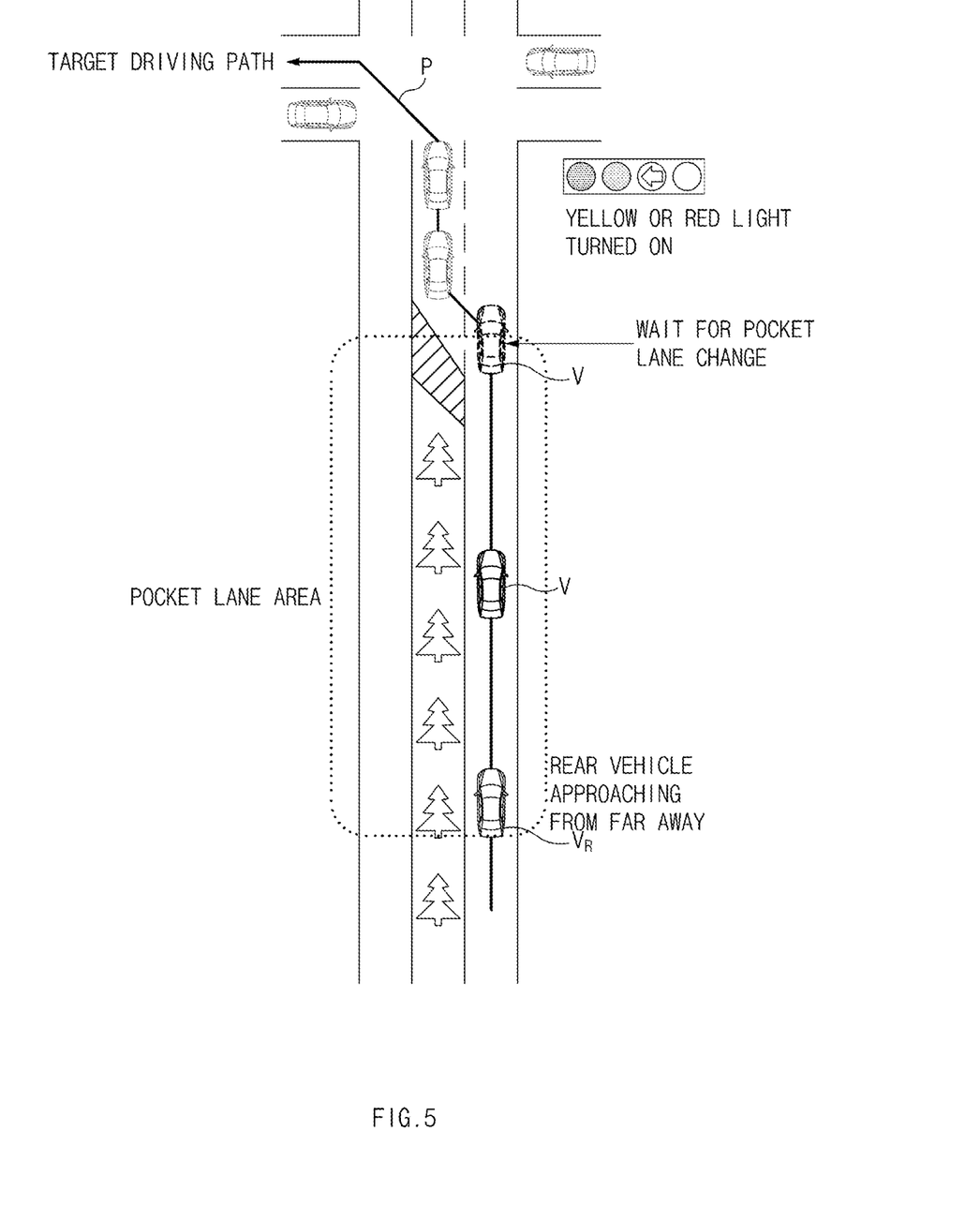
FIGS. 5 to 9 illustrate drive control according to pocket lane conditions.

The driving path generator 150 may determine whether or not the subject vehicle is allowed to stop according to the detected pocket lane conditions in S132. The driving path generator 150 may determine whether or not the subject vehicle is allowed to stop on the basis of the degree of traffic congestion in the pocket lane, the rear vehicle information, and the traffic light information. For example, as illustrated in FIG. 5, in a state in which the pocket lane is congested, when a yellow or red traffic light is turned on and a rear vehicle $V_R$ is spaced apart from the subject vehicle V by a reference distance or greater, the driving path generator 150 may determine that the subject vehicle is allowed to stop.

When the driving path generator 150 has determined that the subject vehicle is allowed to stop, the vehicle controller 170 may turn on the left-turn signal and reduce a vehicle speed in order to enter the pocket lane in S133. The vehicle controller 170 may turn on the turn signal before several seconds (for example, three to four seconds) within the pocket lane area in order to enter the pocket lane, and reduce the vehicle speed.

The driving path generator 150 may check whether or not a front vehicle is present in the pocket lane in S134. The driving path generator 150 may check the presence or absence of the front vehicle within the pocket lane through the sensor unit 110.

Figure 7:
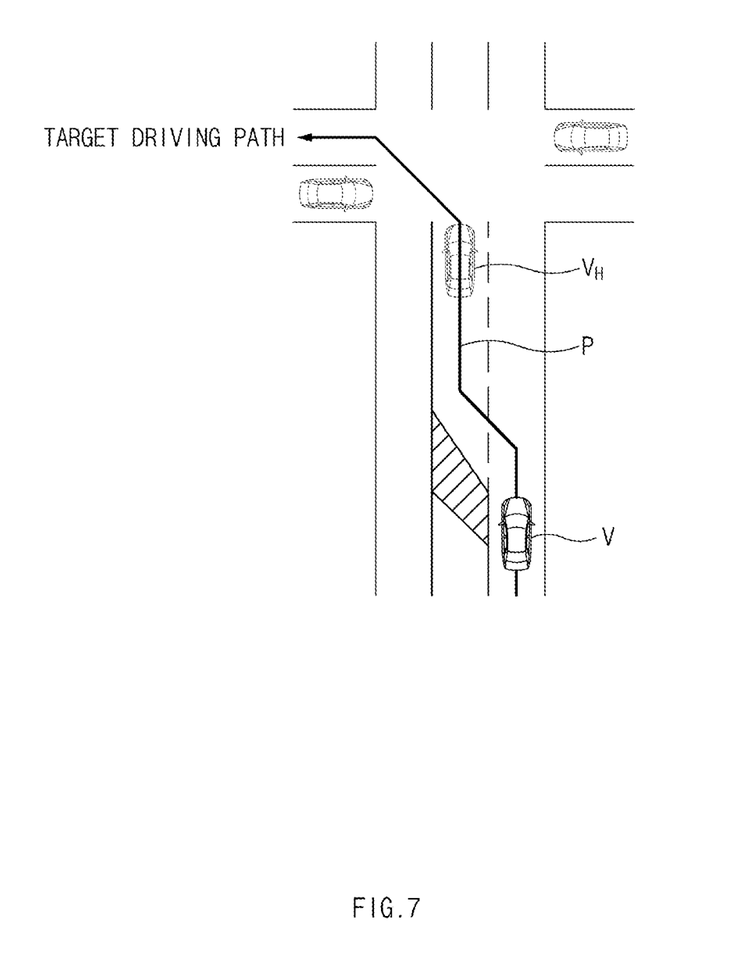

When the front vehicle is present in the pocket lane, the driving path generator 150 may detect the position of the front vehicle $V_H$ in S135. For example, as illustrated in FIG. 7, when a front vehicle $V_H$ is present in the pocket lane, the driving path generator 150 may detect the position of the front vehicle $V_H$ through the sensor unit 110.

The driving path generator 150 may determine whether or not the subject vehicle is allowed to enter the pocket lane on the basis of a driving path P in S136. In other words, the driving path generator 150 may check whether or not there is a space allowing the subject vehicle V to enter the pocket lane through the sensor unit 110.

When the subject vehicle is allowed to enter the pocket lane, the driving path generator 150 may provide the existing driving path P to the vehicle controller 170, and the vehicle controller 170 may perform autonomous driving on the basis of the existing driving path P in S137. In other words, when the subject vehicle is allowed to enter the pocket lane, the vehicle controller 170 may control the autonomous driving while allowing the subject vehicle V to enter the pocket lane along the existing driving path P, as illustrated in FIG. 7.

Figure 6:
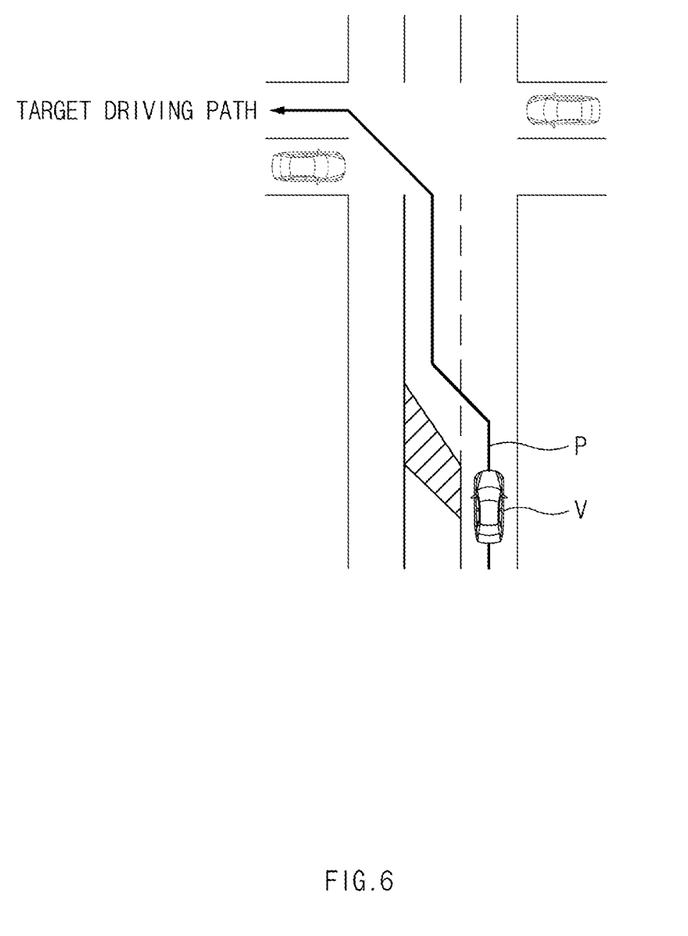

Meanwhile, when the driving path generator 150 has determined that the front vehicle is not present in the pocket lane in S134, the vehicle controller 170 may control the autonomous driving on the basis of the existing driving path P in S137. As illustrated in FIG. 6, when the front vehicle $V_H$ is not present in the pocket lane, the vehicle controller 170 may control the subject vehicle V to perform the autonomous driving along the existing driving path P and make a left turn.

Figure 8:
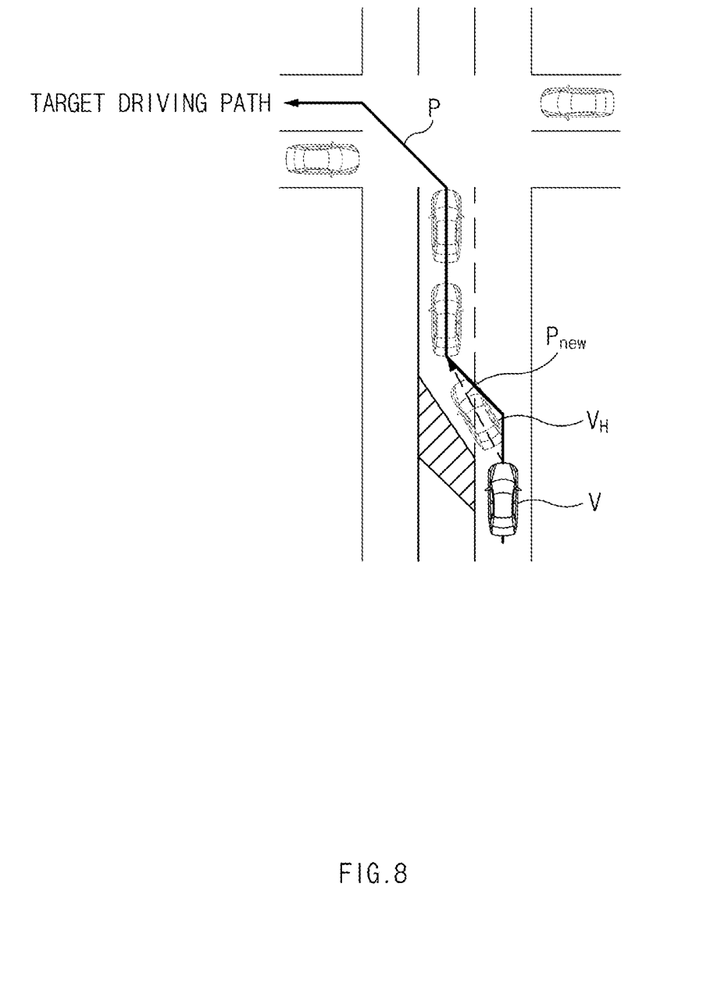

Meanwhile, when the subject vehicle is not allowed to enter the pocket lane on the basis of the driving path in S136, the driving path generator 150 may determine whether to enter the pocket lane in S138. For example, when the pocket lane is full of vehicles waiting for the left-turn signal as illustrated in FIG. 8, the driving path generator 150 may determine to enter the pocket lane if the subject vehicle V is allowed to cut in by taking the position of the front vehicle $V_H$ into account when driving along the global path.

After determining whether to enter the pocket lane, the driving path generator 150 may check whether or not the entry to the pocket lane has been determined in S140. In other words, the driving path generator 150 may check the results of the determination as to whether to enter the pocket lane.

When the entry to the pocket lane has been determined, the driving path generator 150 may generate a front vehicle tracking path in S150. When the entry to the pocket lane has been determined, the vehicle controller 170 may allow the subject vehicle to stop behind the front vehicle $V_H$, and the driving path generator 150 may generate a tracking path $P_{new}$ for following the front vehicle $V_H$, as illustrated in FIG. 8.

The vehicle controller 170 may perform the front vehicle tracking control on the basis of the front vehicle tracking path generated by the driving path generator 150 and allow the subject vehicle to enter the pocket lane in S160. The vehicle controller 170 may control the autonomous driving of the subject vehicle along the front vehicle tracking path $P_{new}$, and when the subject vehicle reaches the existing driving path P, the vehicle controller 170 may control the autonomous driving along the existing driving path P.

Meanwhile, when it is determined that the vehicle does not enter the pocket lane in S140, the driving path generator 150 may search a straight driving path again in S170. Thereafter, the vehicle controller 170 may perform the autonomous driving according to the straight driving path newly searched by the driving path generator 150.

Figure 9:
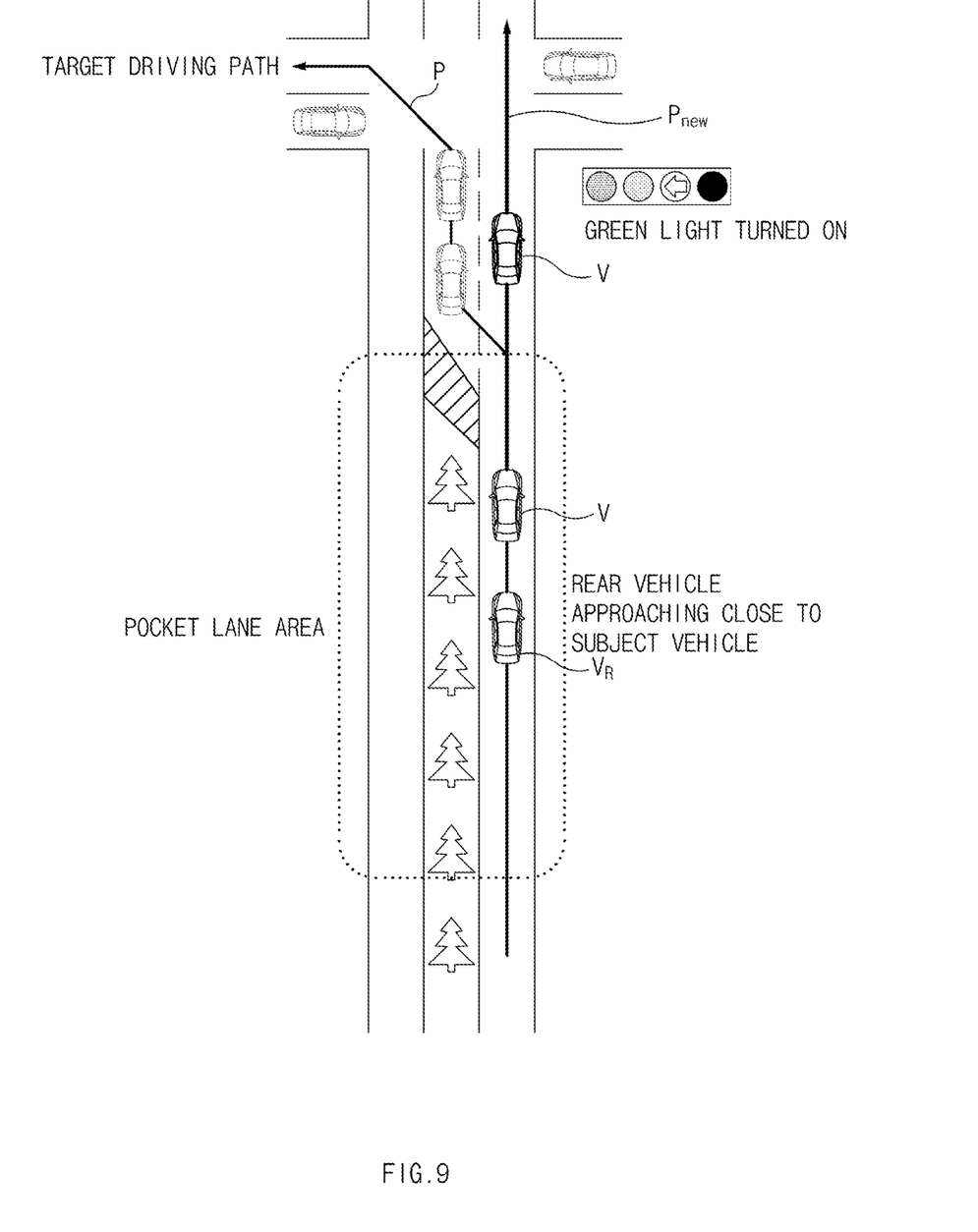

Meanwhile, when the subject vehicle is not allowed to stop in S132, the driving path generator 150 may search the straight driving path to generate a new driving path in S170. As illustrated in FIG. 9, in a situation in which the subject vehicle is forced to stop in the straight driving lane rather than the pocket lane for making the left turn due to the vehicles waiting in the pocket lane, when a green traffic light is turned on and the rear vehicle $V_R$ is approaching within a reference distance from the subject vehicle V, if the subject vehicle V stops in the straight driving lane not in the pocket lane, this may increase the risk of an accident, and thus, the subject vehicle is not allowed to stop. Therefore, the driving path generator 150 may search a new path for reaching the predetermined destination while driving on the straight lane, and reset a driving path (a global path). The vehicle controller 170 may perform autonomous driving along the reset driving path.

In the above-described embodiments of the present disclosure, all of the elements can be combined to operate as a single system, but the present inventive concept is not limited thereto. Some of the elements may be selectively combined to operate within the scope of the present inventive concept. In addition, each of the elements may be provided as an independent hardware unit, and some of the elements may be selectively combined such that a computer program having program modules can perform functions of the elements in a single or a plurality of hardware units. Codes and code segments constituting the computer program may easily be inferred by a person skilled in the art. In addition, the computer program may be stored in a computer-readable medium and be read and executed by a computer, thereby implementing the method according to the embodiment of the present disclosure.

As set forth above, embodiments of the present disclosure may provide a safe driving path according to pocket lane conditions by analyzing the pocket lane conditions, and thus the autonomous vehicle may safely cope with dangerous situations when entering the pocket lane.

In addition, embodiments of the present disclosure may generate and provide a temporary (global) path for following a front vehicle rather than a global path allowing the vehicle to cut in when the autonomous vehicle enters the pocket lane, thereby allowing the autonomous vehicle to safely enter the pocket lane and drive along the target driving path.

Furthermore, when it is required to deviate from the global path originally set according to the driving conditions, embodiments of the present disclosure may generate and provide a new global path by searching a driving path before the path deviation, thereby allowing the autonomous vehicle to deal with the path deviation quickly.

In addition, embodiments of the present disclosure determine a driving path reset quickly according to the approach of the rear vehicle and the degree of traffic congestion in the pocket lane by setting the pocket lane area used for entering the pocket lane.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A drive control method for an autonomous vehicle, the method comprising:
   determining whether the subject vehicle has entered a pocket lane area during autonomous driving;

subsequently, determining whether the subject vehicle will enter a pocket lane based on pocket lane conditions, the lane conditions being determined on the basis of surrounding environment information of the subject vehicle when the subject vehicle enters the pocket lane area;

generating a tracking path with respect to a front vehicle when it is determined to enter the pocket lane; and performing the autonomous driving by controlling the subject vehicle to follow the front vehicle according to the tracking path with respect to the front vehicle.

2. The drive control method according to claim 1, wherein the pocket lane area is defined as an area within a predetermined distance from a pocket lane entry point in a straight driving lane that is positioned on the right of the pocket lane.

3. The drive control method according to claim 2, wherein a length of the pocket lane area is calculated using a road speed limit and a time taken for the vehicle to reach the pocket lane when the vehicle is driving at the road speed limit.

4. The drive control method according to claim 1, wherein determining whether the subject vehicle would enter the pocket lane comprises:

determining the pocket lane conditions by detecting a degree of traffic congestion in the pocket lane, a distance between a rear vehicle and the subject vehicle, a relative speed of the rear vehicle, and a color of a traffic light that is turned on, on the basis of data measured by sensors;

determining whether the subject vehicle is allowed to stop according to the pocket lane conditions;

turning on a turn signal and reducing a vehicle speed when the subject vehicle is allowed to stop;

checking whether the front vehicle is present in the pocket lane while the subject vehicle is reducing the vehicle speed;

detecting a position of the front vehicle when the front vehicle is present in the pocket lane;

determining whether the subject vehicle is allowed to enter the pocket lane along a driving path based on the position of the front vehicle; and performing the autonomous driving along the driving path when the subject vehicle is allowed to enter the pocket lane.

5. The drive control method according to claim 4, further comprising generating a new driving path to reach a predetermined destination by driving on a straight driving lane unless it is determined that the subject vehicle is allowed to stop in determining whether or not the subject vehicle is allowed to stop.

6. The drive control method according to claim 4, further comprising performing the autonomous driving along the driving path unless it is determined that the front vehicle is present in the pocket lane in checking whether or not the front vehicle is present in the pocket lane.

7. The drive control method according to claim 4, further comprising determining whether the subject vehicle enters the pocket lane unless the subject vehicle is allowed to enter the pocket lane in the step of determining whether the subject vehicle is allowed to enter the pocket lane along the driving path.

8. A drive control apparatus for an autonomous vehicle, comprising:

a sensor unit configured to sense surrounding environment information of the subject vehicle;

a driving path generator configured to detect pocket lane conditions on the basis of the surrounding environment information when the subject vehicle enters a pocket lane area during autonomous driving, determining whether the subject vehicle enters a pocket lane according to the detected pocket lane conditions, and generating a driving path; and a vehicle controller configured to control the autonomous driving of the subject vehicle according to the driving path.

9. The drive control apparatus according to claim 8, wherein the driving path generator is further configured to analyze the pocket lane conditions by detecting a degree of traffic congestion in the pocket lane, a distance between a rear vehicle and the subject vehicle, a relative speed of the rear vehicle, and a color of a traffic light that is turned on through the sensor unit.

10. The drive control apparatus according to claim 9, wherein the driving path generator is further configured to whether the subject vehicle is allowed to stop according to results of analyzing the pocket lane conditions.

11. The drive control apparatus according to claim 10, wherein the driving path generator is further configured to the vehicle controller to turn on a turn signal and reduce a vehicle speed when the subject vehicle is allowed to stop, and checks whether a front vehicle is present in the pocket lane.

12. The drive control apparatus according to claim 11, wherein the driving path generator is further configured to detect a position of the front vehicle in the pocket lane when the front vehicle is present in the pocket lane, and to determine whether the subject vehicle is allowed to enter the pocket lane along the driving path.

13. The drive control apparatus according to claim 12, wherein the driving path generator is further configured to provide the driving path to the vehicle controller when the subject vehicle is allowed to enter the pocket lane along the driving path.

14. The drive control apparatus according to claim 12, wherein the driving path generator is further configured to generate a tracking path with respect to the front vehicle unless the subject vehicle is allowed to enter the pocket lane along the driving path.

15. The drive control apparatus according to claim 10, wherein the driving path generator further configured to search or generate a new driving path to reach a predetermined destination by driving on a straight driving path unless the subject vehicle is allowed to stop.

* * * * *